Feb. 3, 1959
M. L. EDWARDS
2,872,084
PUMP ASSEMBLY
Filed Feb. 3, 1956
4 Sheets-Sheet 1
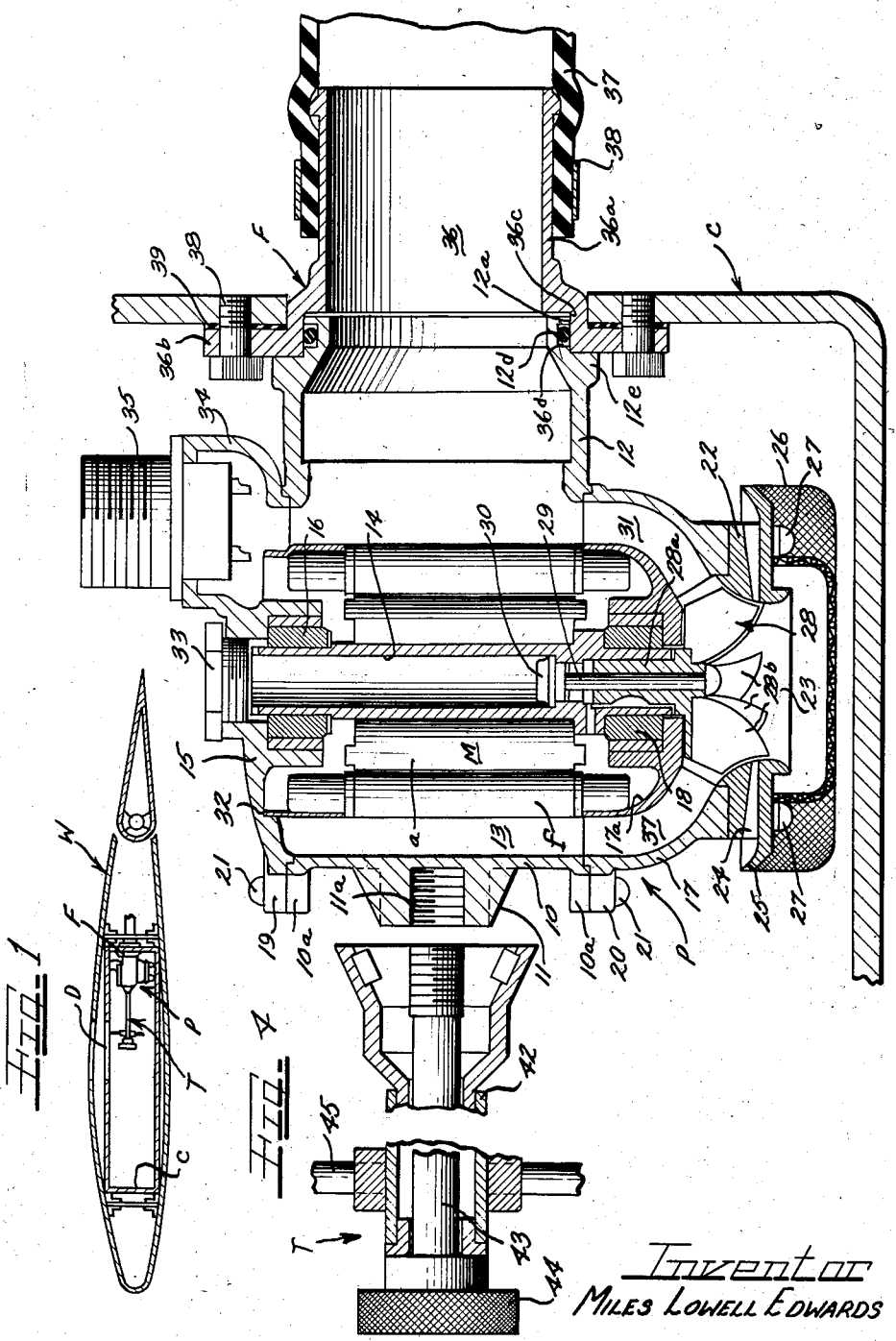
Inventor
MILES LOWELL EDWARDS Feb. 3, 1959 M. L. EDWARDS 2,872,084
PUMP ASSEMBLY
Filed Feb. 3, 1956 4 Sheets-Sheet 2
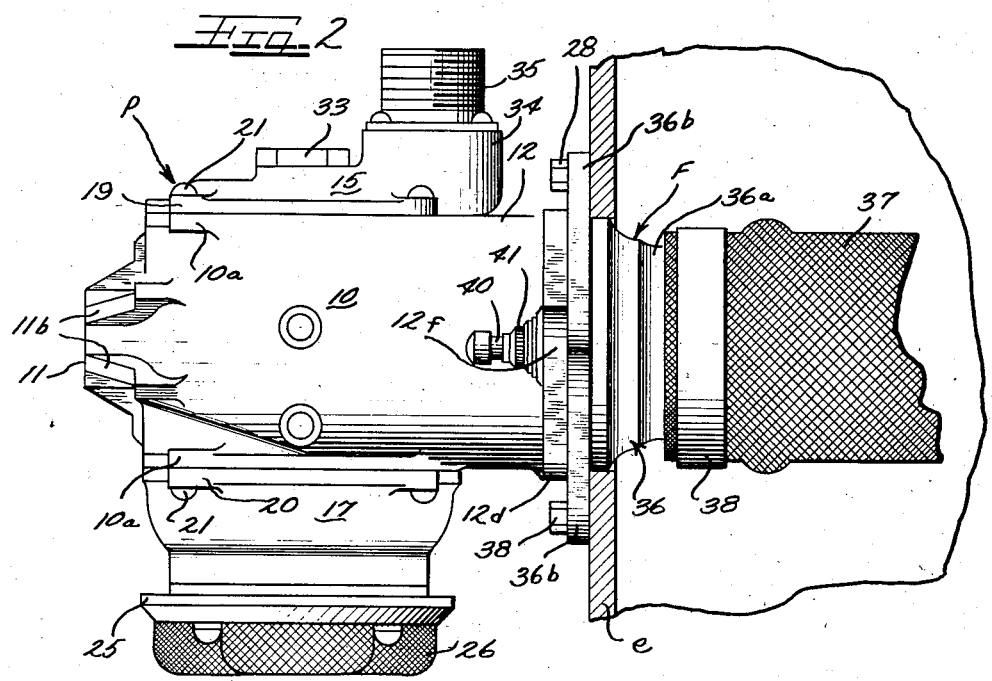
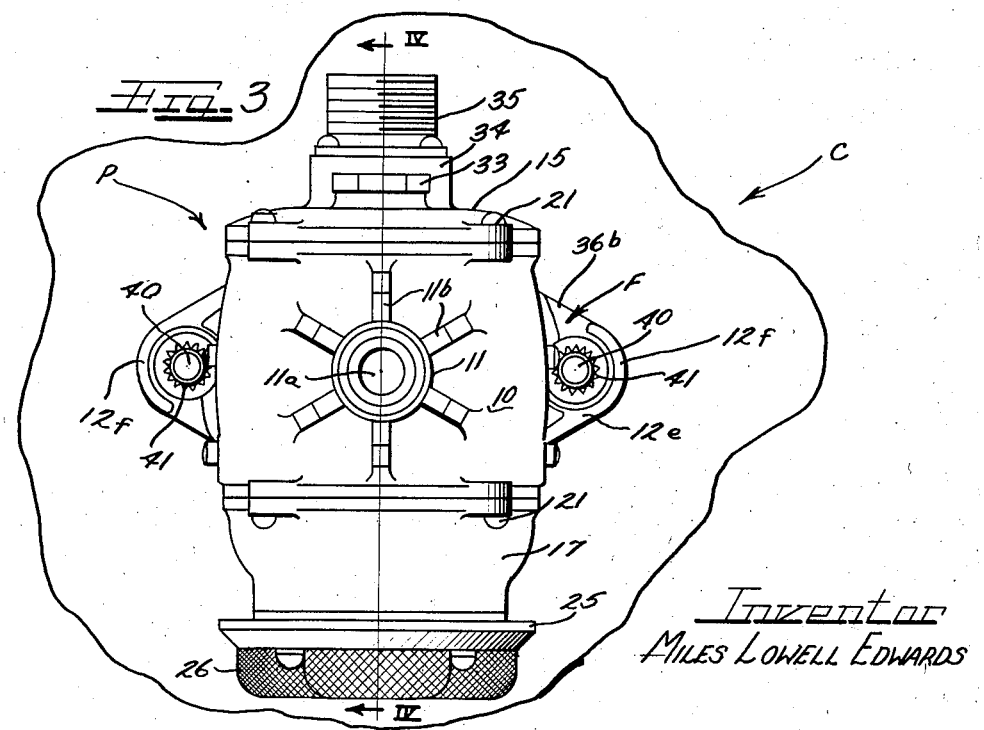
Inventor
MILES LOWELL EDWARDS

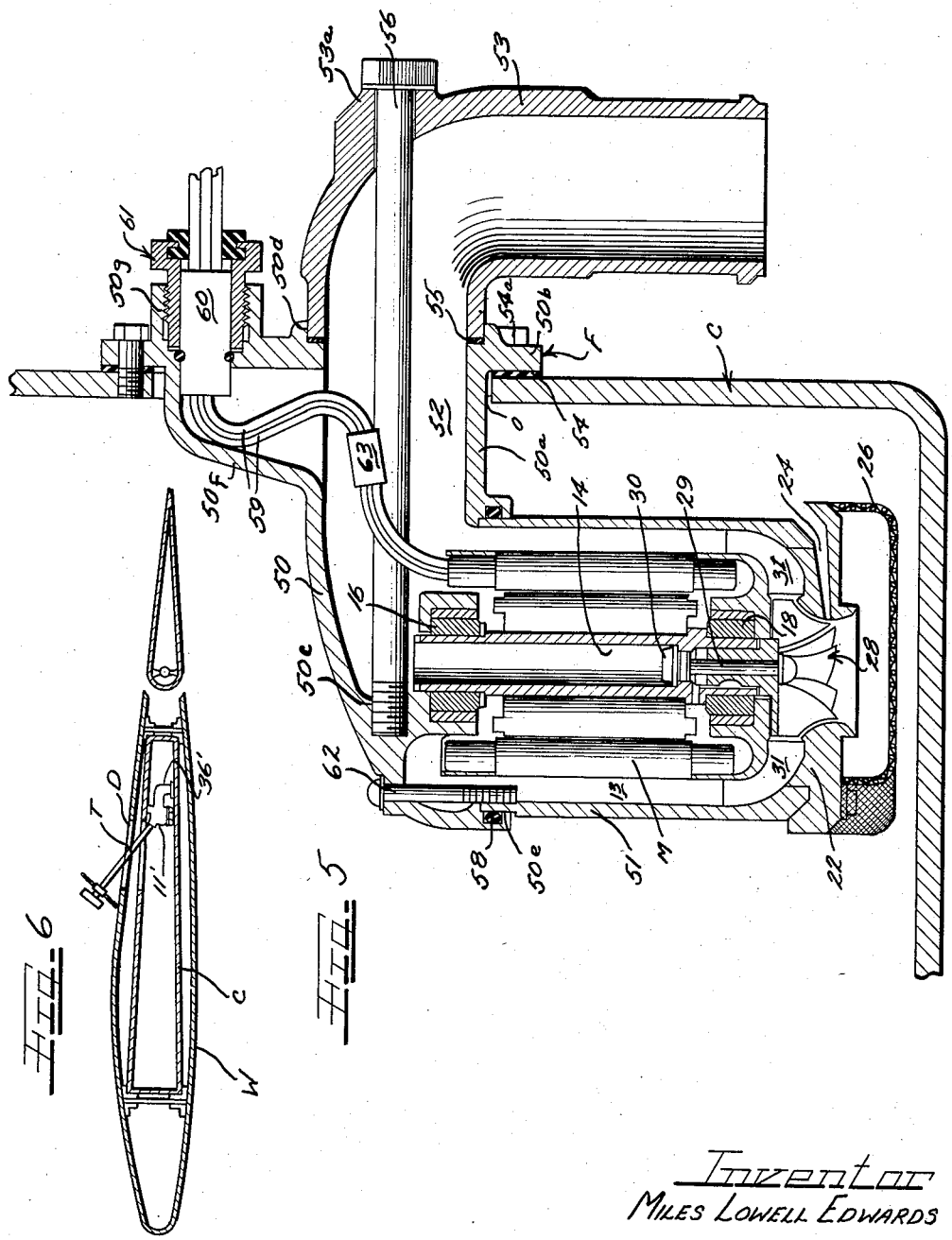

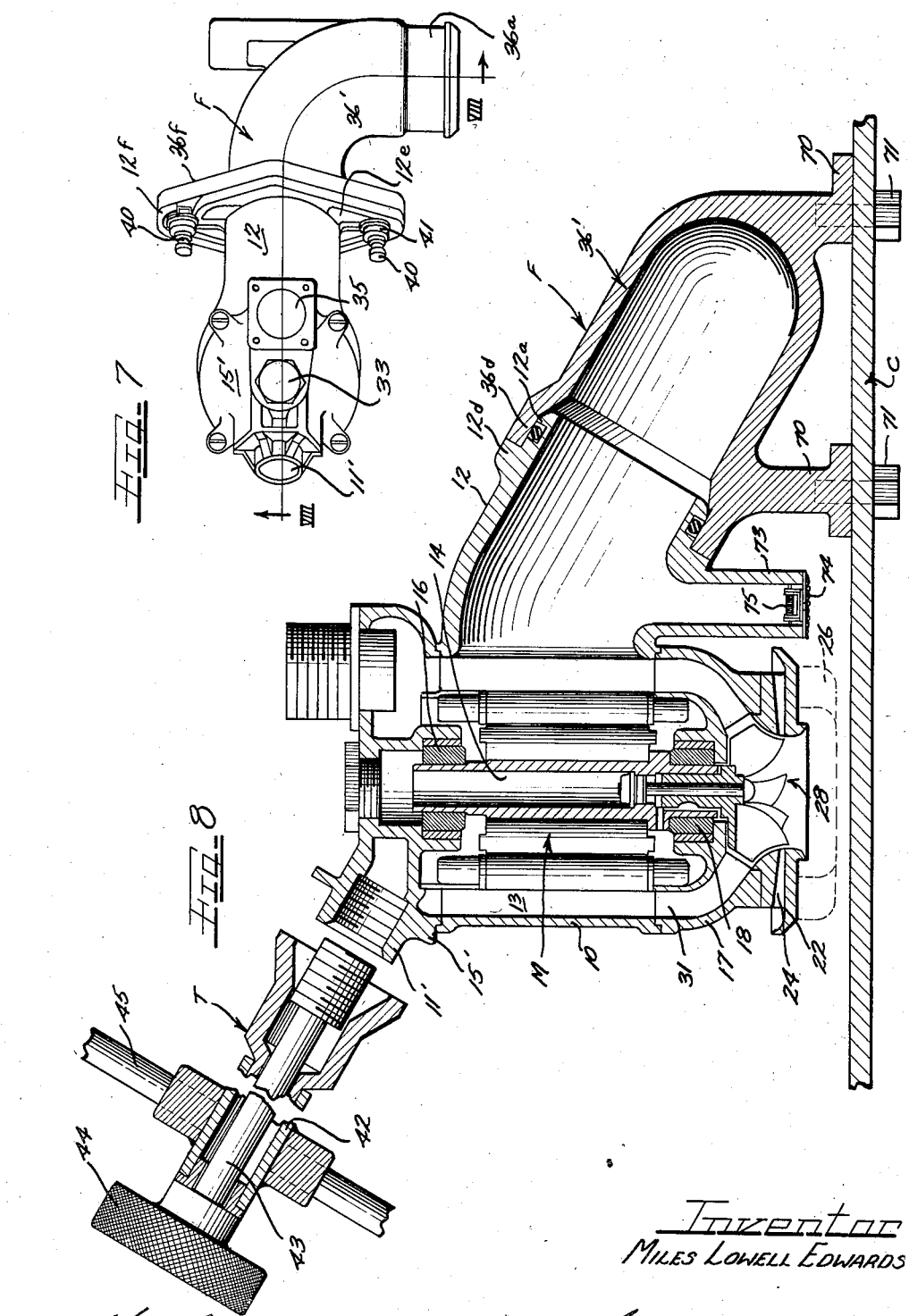

United States Patent Office 2,872,084
Patented Feb. 3, 1959

2,872,084

PUMP ASSEMBLY

Miles Lowell Edwards, Portland, Oreg.

Application February 3, 1956, Serial No. 563,282

8 Claims. (Cl. 222—333)

This invention relates to pumps which are easily installed in tanks or the like, wherein the pump discharge outlet serves the dual function of a mounting for the pump. Specifically, this invention relates to fuel cell carried electric motor driven booster pump units which receive the fuel directly from the bottom portion of the cell and flow the fuel through the pump body to a cell mounted fitting wherein the discharge outlet from the body of the pump coacts with the fitting to hang the pump in the fuel cell.

While the invention will hereinafter be specifically described as embodied in aircraft booster pumps and cell mountings for such pumps, it should be understood that the principles of this invention are applicable to other fluid flow devices and couplings and, therefore, the invention is not limited to the preferred illustrated embodiments.

According to this invention, there are provided pump and electric motor units wherein the fluid propelled by the pump is circulated around the motor in intimate contact therewith and is discharged out of the motor casing into a tank carried fitting through an outlet conduit forming part of the casing and serving as a hanger for the units. The pump has a centrifugal impeller effective to eliminate bubbles and discharge fully liquid material. Diffuser vanes are preferably included in the pump to diffuse the liquid around the motor enroute to the outlet. The motor, of course, is of the non-arcing type free from slip rings, commutators, and the like. Suitable motors include alternating current induction, synchronous, or hysteresis motors.

A feature of the invention resides in the ease of removing and replacing the electric motor-pump units in fuel cells without draining the fuel from the cell.

Another feature of the invention resides in the provision of electric motor and pump units that are easily mounted in aircraft fuel cells and do not require appreciable headroom.

It is then an object of this invention to provide electric motor-booster pump units of minimum height which are adapted to be easily "plugged" into fuel cells without draining the cells.

A further object of the invention is to provide electric motor driven booster pump units for aircraft fuel cells wherein the pump propels the fuel around the motor and out through a motor casing conduit which is detachably connected to a pump mounted fitting and serves to suspend the units in the cell.

A still further object of this invention is to provide compact high capacity pump and electric motor units which are easily coupled to discharge fittings.

A still further object of this invention is to provide a fluid flow unit adapted to be easily mounted in a tank from a remote access opening of the tank.

Another still further object of this invention is to provide an electric motor-booster pump unit with a casing having a discharge outlet for mounting on a fuel cell carried fitting to suspend the unit in the fuel cell and having a tool receiving portion whereby a mounting tool can readily position the unit in the tank and remove the unit from the tank.

Another object of the invention is to provide a compact electric motor driven vapor separating booster pump with a casing having a discharge outlet to coact with a tank mounted fitting for hanging the unit in the tank and a tool receptacle for coacting with a grappling tool to facilitate insertion and removal of the unit from a remote portion of the tank.

Other and further objects of this invention will be apparent to those skilled in this art from the following detailed description of the annexed sheets of drawings which, by way of preferred embodiments, show several modifications of this invention.

On the drawings:

Figure 1 is a diagrammatic cross-sectional view, with parts in elevation, of a typical aircraft wing section and fuel cell, having installed therein one form of electric motor driven booster pump and mounting assembly according to the present invention.

Figure 2 is an enlarged side elevational view of the pump assembly of Figure 1.

Figure 3 is a front elevational view of the pump assembly shown in Figure 2.

Figure 4 is a cross-sectional view of the pump assembly of Figure 3, with parts in elevation, taken generally along the line IV—IV of Figure 3.

Figure 5 is a fragmentary, longitudinal, cross-sectional view, with parts in elevation, of another form of fuel cell mounted electric motor driven booster pump assembly of the present invention.

Figure 6 is a diagrammatic cross-sectional view, with parts in elevation, of a typical aircraft wing and fuel cell carrying still another form of electric motor driven booster pump assembly and showing a grappling tool for inserting and removing the pump according to the present invention.

Figure 7 is a top view of the pump assembly of Figure 6 with parts in elevation, showing the inside tank mounting fitting, according to the present invention.

Figure 8 is a cross-sectional view of the pump assembly of Figure 7, with parts in elevation, taken generally along the line VIII—VIII of Figure 7 and showing a portion of the grappling tool.

As shown on the drawings:

In Figure 1, a typical aircraft wing cross-section is illustrated, designated generally by the reference letter W. A fuel cell C is mounted in the wing W and a fuel booster pump and electric motor assembly P of the present invention, is shown "plugged" into a fitting F mounted in a rear wall portion of the cell C to secure the assembly P in the cell for immersion in the cell contents.

It will be appreciated that while the fitting F is mounted in the rear wall portion of the fuel cell C, any other convenient mounting location could be utilized, depending on the particular installation and flow direction requirements.

The pump assembly P and fitting F are shown in detail in Figures 2 to 4. As therein shown, the pump assembly P includes an upright generally cylindrical shaped metal casing 10 with a tool fixture 11 on the front and a generally cylindrical shaped portion 12 on the rear. The casing 10 supports therein a motor assembly M in the central portion thereof to provide between the motor and casing an annular passage 13. The motor includes a field $f$ surrounding an armature $a$ and a hollow shaft 14 extends through the armature to rotate therewith. A top end cap 15 on the casing 10 carries a bearing 16 for the upper end of the shaft 14. A pump casing 17 on the bottom of the casing 10 carries a bearing 18 for the bottom of the shaft. Ears or lugs 10$a$ on the ends of the casing 10 mate with complementary lugs 19 on the cap 15 and 20 on the pump casing 17 to receive fastening screws 21 for securing the cap and pump casing to the ends of the main casing 10.

The pump casing 17 has an open bottom receiving a throat-ring 22 which provides a bottom opening inlet 23 for the pump and which has a plurality of radially discharging bubble passages 24 adjacent and surrounding the mouth of the inlet 23. An upturned lip 25 surrounds the outer ends of the bubble passages 24 to direct the bubbles away from the inlet 23. A screen 26 covers the inlet 23 and the screen and throat ring assembly 22 are held on the bottom of the casing 17 by screws 27.

A centrifugal pump impeller 28 is carried and driven by the motor shaft 14.

As best shown in Figure 4, the impeller 28 has a hub portion 28a extending into and keyed to the bottom of the shaft 14 in the zone of the shaft that is surrounded by the bearing 18. A bolt 29 extends through this hub 28a and is threaded into a nut 30 that is bottomed on an internal shoulder of the shaft.

The impeller includes a ring of pumping and vapor separating vanes 28b carried by the hub 28a and surrounding a central zone in full open communication with the inlet 23. The vanes have close running clearance relation with the throat ring 22 and discharge liquid outward between stationary diffuser vanes 31 in the casing 17. These diffuser vanes 31 discharge upwardly into the passage 13 surrounding the motor M. Bubbles of gas and vapor, and vapor-rich liquid, are discharged by the vanes 28b through the openings 24 and are directed by the lip 25 back into the fuel cell C away from the inlet 23.

No attempt is made to isolate the motor M from the fuel in the passage 13 but in order to center the motor in the passage 13, the pump casing 17 has a recess 17a snugly receiving the lower end portion of the field f and the cap 15 carries a collar 32 snugly receiving therein the upper portion of the field f. The cover 15 also has a threaded port closed by a plug 33 to give access to the motor shaft 14 and to permit inspection of the bearing 16. A nipple 34 is also provided on the cap 15 to receive an electric wire conduit plug 35 for supplying current to the motor.

The cylindrical passage 13 in the casing 10 around the motor M, discharges laterally through the conduit portion 12.

The fitting F on the rear wall of the fuel cell C includes a flanged metal coupling member 36 with a tubular projecting portion 36a adapted to be inserted in a conduit hose or tube 37. The hose 37 can be clamped around the portion 36a by a clamping band 38. The member 36 includes a radial flange 36b on the end of the tubular portion 36a. An external shoulder 36c between the portions 36a and 36b, snugly fits in an opening O provided in the rear wall of the fuel cell C. The flange 36b surrounds the opening O on the inside of the fuel cell and a plurality of cap screws 38 extend from the flange 36b to be secured to the fuel cell for clamping the flange tightly against a gasket 39 between the wall of the cell and the flange.

The member 36 has a counterbore recess 36d receiving therein the reduced diameter pilot end 12a of the casing portion 12. This pilot end is grooved to receive a circular ring type seal 12d.

As shown in Figures 2 and 3, the flange 36b of the fitting member 36 carries a pair of diametrically opposed screws 40 each of which have threaded thereon a splined nut 41.

The casing portion 12 has a flat end flange 12e extending radially from the inner end of the pilot portion 12a which is bottomed on the flange 36b. Hook-like ears 12f extend laterally from this flange to receive the screws 40. As will be noted from Figure 3, one ear 12c opens upwardly while the other one opens downwardly.

The tool fixture 11 on the front face of the casing 10, has a central threaded recess 11a and a plurality of radiating splines 11b. As illustrated in Figures 1 and 4, a mounting tool T includes a sleeve 42 with a socket end adapted to be fitted over and splined to the teeth 11b of the fixture. A rod 43 extends through the tube or sleeve and has a threaded end for insertion in the recess 11a. A knob 44 is provided on the end of the rod beyond the tube to thread the rod into the recess 11a and thus attach the tool T to the pump assembly. A handle 45 is provided on the tube to rotate the tool and pump assembly carried thereby.

In order to install the pump in the fuel cell C from a remote access door D, it is only necessary to attach the tool T to the pump, to insert the assembly in the fuel cell with the pilot portion 12a inserted in the counterbore 36d of the fitting and to then rotate the handle 45 of the tool for bringing the ears 12f into position for receiving the screws 40. As viewed in Figure 3, counterclockwise rotation will move the ears into position. A socket wrench is then engaged with the nuts 41 to tighten the same against the ears. The tool is then readily removed from the pump assembly by rotating the knob 44 to unthread the rod 43.

Removal of the pump assembly P from the cell C is just as easy, requiring only the attachment of the tool T, the loosening of the nuts 41 and the reverse rotation of the pump assembly by the tool.

Since the fitting F does not contain any movable or wearing parts, it can be a permanent portion of the fuel cell and could be brazed or welded to the cell.

It will thus be understood that the first embodiment of this invention includes a pump assembly P composed of casing and end cap portions that have a somewhat barrel shape. One face of the assembly has a tool fixture while the opposite face has a mounting flange and ear arrangement for quick attachment to a fitting carried by the fuel cell. The pump has very high capacity, with a minimum headroom requirement.

In the embodiment illustrated in Figure 5, parts substantially identical with those described in Figures 1 to 4, have been identified with the same reference numerals. In Figure 5, however, the top end cap 50 for the cylindrical motor casing 51, has its integral fitting portion F. Thus, the cap 50 receives the pump discharge directly from the annular passage 13 and defines a laterally extending passage 52 discharging directly into a nipple 53 for the fuel hose or tube.

The cap 50 includes a laterally extending integral portion 50a with a radial end flange 50b on the end thereof. The portion 50a extends freely through the opening O in the fuel cell wall and the flange 50b surrounds this opening on the outside of the cell. A gasket 54 is interposed between the flange and the fuel cell and screws 54a secure the flange to the cell.

The nipple 53 fits in a counterbore 50d at the end of the passage 52 against a gasket 55. A bolt 56 extends through a boss portion 53a of the nipple and is threaded into a boss portion 50c of the end cap.

The upper end of the casing 51 fits into a counterbore 50e in the bottom of the cap 50 and a circular seal ring 58 is seated in a groove in this counterbore to sealingly engage a reduced diameter pilot end portion of the casing 51.

The pump casing portion 17 of the embodiment of Figures 1 to 4, is shown as integral in the casing 51 but contains the same diffuser vanes 31 and shaft bearing support as the casing 17.

The end cap 50 has a localized hollow upright portion 50f providing a conduit passage for the electric wires 59 to the motor M. A plug 60 is inserted in this portion and a closure plug 61 is threaded into a collar 50g on the end flange of the fitting to seal the plug.

The pump assembly of Figure 5 is inserted in the cell through the opening O and it will be noted that the overall diameter of the portion of the assembly which is submerged in the cell is relatively small so that the throat ring end of the pump will easily fit through the opening and then as the main portion of the cap 50 is about to enter the cell, the assembly can be tilted to bring the flange 50b against the side wall of the cell. The screws 54a are then threaded home to unite the assembly to the cell.

The end cap 50, as shown, is united to the casing 51 by means of screws 62 threaded in lugs in the inside of the casing 51. If it is desired to replace the pump or motor without uncoupling the fitting F from the tank wall, these screws 62 can be removed and the casing 51 dropped from the hanger cover 50. A wire coupler 63 can then be separated and the pump and motor unit is then removable from the cell C without draining the cell. Installation of the replacement pump and motor unit then merely requires closing the coupler 63, insertion of the pilot end 51a of the casing 51 in the cover counterbore 50e and tightening of the screws 62.

In the third embodiment illustrated in Figures 6 to 8, parts substantially identical with parts described in Figures 1 to 4, have been marked with the same reference numerals.

As shown in Figures 6 to 8, the fitting F, like the fitting F of Figures 1 to 4, receives a main casing-mounted rearwardly extending conduit portion 12 with its pilot end fitting in the mouth or counterbore of the fitting F.

In the embodiment of Figures 6 to 8, however, the member 36' of the fitting F has feet 70 mounted on the bottom wall of the fuel cell C as by means of mounting screws 71 or the like, and has the tubular hose receiving portion 36a on the end of an elbow 72 which turns the discharge from the conduit 12, 90° so that the fluid will flow through a side wall of the tank. In this installation, therefore, the fitting F is inside of the tank and has the portion 36a receiving the discharge tube or hose which projects into the tank from any suitable cell wall.

The counterbored mouth 36d of the fitting member 36' opens on an upward incline while the conduit portion 12 of the casing is slanted downwardly to mate the pilot portion 12a thereof in this counterbore and still carry the casing 10 in an upright vertical position. The conduit portion 12, as illustrated, has a depending outlet passage 73 carrying a flap valve 74 at the bottom end thereof adapted to open inwardly in the event that the pump inlet 23 becomes clogged whereupon fuel can be fed to the fitting even though the pump passage is stopped.

A light spring 75 holds the flap valve 74 in closed position but this spring is not sufficiently strong to keep the passage 73 closed from communication with the fuel cell in the event that downstream pressure in the fitting F is less than the pressure in the fuel cell.

The end cap 15' carries the tool fixture 11' in an upwardly inclined direction for ease of access from an overhead access opening in the fuel cell as illustrated in Figure 6.

The pump assembly of Figures 6 to 8 is mounted in the cell in the same way as described in connection with Figures 1 to 4. The fitting F including the elbow portion 36', provides an inside tank fitting with a mounting pilot directed toward the access hole of the cell. This provides an angular plug-in arrangement that is more easily acceptable from the access opening than the arrangement of Figures 1 to 4.

From the above descriptions it will, therefore, be understood that this invention provides plug-in attachments for electric motor-booster pump units with motor casings which receive the pump discharge to reduce the overall height of the assembly and adapt the units for thin fuel cells such as are provided in thin airplane wings. The mounts of this invention provide for the replacement of the electric motor-booster pump units in fuel cells without draining of the cells since the fittings which mount the units can remain connected with the outlet conduits and removal of the units is through the top wall of the cells.

It will be understood that variations and modifications may be effected without departing from the scope of the novel concepts of this invention.

I claim as my invention:

1. A plug-in type pump and motor unit for mounting in fuel tanks and the like, which comprises a casing, a pump in one end of said casing having a ring of diffuser vanes discharging into the casing around the periphery thereof, a motor in said casing surrounded by a discharge passage receiving flow from said vanes, a fitting fixed to a side wall of said tank to attach and suspend said pump and motor unit therein and having a flow passage adapted to convey fluid from the pump out of the tank, said fitting having a recess, a pilot portion on said casing snugly fitting in said recess, and means for detachably connecting the pilot portion to the fitting.

2. A submerged type pump and motor unit for aircraft fuel cells and the like, which comprises a pump and motor unit having a laterally extending discharge conduit on one side thereof and a tool fitting on the other side thereof, a cell fitting adapted to receive the conduit of said unit, means for mounting the cell fitting on a side wall of the cell, said cell fitting having a passage therethrough accommodating flow from the conduit, screws projecting from said cell mounting on opposite sides of the conduit, nuts carried by said screws, hook-like ears on the conduit adapted to embrace said screws and be abutted by said nuts to mount the unit on the cell fitting, whereby a tool engageable with the tool fitting on the unit facilitates insertion of the unit in a tank from a remote cell access opening.

3. A pump and motor unit which comprises an open-ended casing, a discharge outlet nipple extending laterally from said casing intermediate the open ends thereof, a pump casing mounted on one end of said casing and having an inlet in the one thereof and an annular outlet in the other end thereof, a cap on the other open end of the casing, said cap and said pump casing having opposed bearings therein, an electric motor in said casing having a stationary field portion carried by the end cap and pump casing and an armature shaft carried by said bearings, said casing having an annular passage between the motor field and the casing wall receiving discharge from the annular outlet of the pump casing, said outlet nipple of the casing being in full communication with said annular passage, means adapted to be fixedly mounted on a side wall of a tank and having a flow passage therethrough, and said means receiving said outlet nipple of the casing to simultaneously suspend the unit in the tank and receive the discharge of the pump.

4. A pump and motor unit adapted for suspended mounting in a tank from a side wall of the tank which comprises a casing, a pump mounted in one end of the casing, a cover for the other end of the casing having a discharge conduit communicating with the pump, a motor mounted in the casing between the pump and discharge conduit receiving the pump discharge therearound, said cover having a laterally extending discharge portion, a mounting flange on said discharge portion adapted to mount the cover on the side wall of the tank, and means for detachably mounting the casing to the cover.

5. A pump and motor unit comprising a casing having a discharge nipple extending laterally and downwardly therefrom, a pump in said casing having a bottom inlet communicating with said nipple, a fitting adapted to be mounted on the inside bottom of a tank having an inclined mouth portion for receiving the nipple and a discharge portion extending laterally in said tank at right angles to said inclined mouth portion, a tool receptacle on the unit inclined in the same direction as the nipple adapted to receive a mounting tool, and means for coupling the nipple to the fitting.

6. In combination with a tank having top, bottom and side walls and an access opening in the top wall, a fitting mounted on a side wall of said tank and projecting therethrough, said fitting having a flow passage therein, a pump and motor unit having a discharge nipple mating with the fitting, fastening means for uniting the nipple with the fitting to suspend the unit in the tank, and a tool receptacle facing the access opening of the tank when the nipple is mounted in the fitting whereby a tool secured to said receptacle will facilitate installation of the unit.

7. A pump and motor assembly for disposition inside a tank for liquid, comprising a housing open at the bottom, a motor and pump inside said housing and spaced from the housing, means providing a liquid passage for pumped liquid around said motor inside the housing, a discharge conduit formation on said housing leading from said passage means, and a hollow mounting and outlet fitting for extending through and connectable to a side wall of the tank with the inner end thereof connected to said formation inside the tank to suspend the assembly inside the tank.

8. A fuel supply assembly for aircraft or the like comprising in combination a hollow fuel tank having walls defining a fuel chamber therein and having a first opening through a first wall area for the discharge of fuel and having a second opening in a second wall area spaced from the first for the installation of a fuel pump, a removable panel for sealingly covering said second wall area, means for attaching said panel to said tank wall, an electrical motor and fuel pump assembly for locating within the tank and adapted to pass through said second opening, a fuel discharge fitting connected to said fuel pump for the discharge of fuel, and a connector for sealed attachment to said discharge fitting and to close said first opening whereby the motor and pump can be installed inside of said fuel tank.

References Cited in the file of this patent

UNITED STATES PATENTS

| 2,384,254 | Meredew | Sept. 4, 1945 |
| 2,420,315 | Holt et al. | May 13, 1947 |
| 2,479,210 | Compton | Aug. 16, 1949 |
| 2,715,483 | Meredew et al. | Aug. 16, 1955 |
| 2,721,677 | Meredew et al. | Oct. 25, 1955 |

FOREIGN PATENTS

| 577,164 | Great Britain | May 7, 1946 |
| 608,121 | Great Britain | Sept. 9, 1948 |